United States Patent
Lee et al.

(10) Patent No.: US 9,221,714 B2
(45) Date of Patent: Dec. 29, 2015

(54) APPARATUS FOR CHEMICALLY TOUGHENING GLASS AND METHOD OF CHEMICALLY TOUGHENING GLASS USING THE SAME

(71) Applicant: SAMSUNG CORNING PRECISION MATERIALS CO., LTD., Gyeongsangbuk-do (KR)

(72) Inventors: Hoikwan Lee, ChungCheongNam-Do (KR); Jaeho Lee, ChungCheongNam-Do (KR); Kyungmin Yoon, ChungCheongNam-Do (KR); Seo-Yeong Cho, ChungCheongNam-Do (KR)

(73) Assignee: SAMSUNG CORNING PRECISION MATERIALS CO., LTD., Gyeongsangbuk-Do (KR)

( * ) Notice: Subject to any disclaimer, the term of this patent is extended or adjusted under 35 U.S.C. 154(b) by 21 days.

(21) Appl. No.: 14/069,087

(22) Filed: Oct. 31, 2013

(65) Prior Publication Data
US 2014/0116090 A1   May 1, 2014

(30) Foreign Application Priority Data
Nov. 1, 2012  (KR) .................. 10-2012-0122795

(51) Int. Cl.
*C03C 21/00*  (2006.01)
*C03C 23/00*  (2006.01)
(Continued)

(52) U.S. Cl.
CPC ........... *C03C 21/002* (2013.01); *C03C 23/0065* (2013.01); *H05B 6/78* (2013.01); *H05B 6/80* (2013.01); *H05B 2206/044* (2013.01)

(58) Field of Classification Search
USPC ................................................ 65/30.14, 181
IPC ............................................ C03C 21/00,21/002
See application file for complete search history.

(56) References Cited

U.S. PATENT DOCUMENTS 3,751,238 A * 8/1973 Grego et al. ................. 65/30.14
3,773,489 A * 11/1973 Forker et al. ................ 65/30.14
(Continued)

FOREIGN PATENT DOCUMENTS

CN         1795149 A      6/2006
CN      101921054 A     12/2010
(Continued)

OTHER PUBLICATIONS

David E. Clark et al., "Processing materials with microwave energy", Materials Science and Engineering, A287 Aug. 15, 2000, pp. 153-158, XP008125077, ISSN: 0921-5093, DOI:10.1016/S0921-5093(00)00768-1 [retrieved on Jul. 24, 2000].

*Primary Examiner* — Mark Halpern
(74) *Attorney, Agent, or Firm* — McDermott Will & Emery LLP

(57) ABSTRACT

An apparatus for chemically toughening glass which can toughen the surface of the glass by inducing compressive stress on the glass surface through ion exchange and a method of chemically toughening glass using the same. The apparatus includes a chemical toughening bath which chemically toughens the glass; a transportation part which transports the glass from upstream of the chemical toughening bath through the chemical toughening bath to downstream of the chemical toughening bath; and a microwave generator disposed above the chemical toughening bath, the microwave generator radiating microwaves to the glass.

14 Claims, 6 Drawing Sheets

(51) Int. Cl.
*H05B 6/80* (2006.01)
*H05B 6/78* (2006.01)

(56) References Cited

U.S. PATENT DOCUMENTS

| | | | |
|---|---|---|---|
| 5,782,947 A | | 7/1998 | Boaz |
| 5,827,345 A | * | 10/1998 | Boaz et al. ............ 65/104 |
| 5,977,529 A | | 11/1999 | Willert-Porada et al. |
| 6,092,392 A | | 7/2000 | Verlinden |
| 2004/0221615 A1 | * | 11/2004 | Postupack et al. ............ 65/30.14 |
| 2006/0026994 A1 | | 2/2006 | Yoshizawa |
| 2009/0235691 A1 | | 9/2009 | Postupack et al. |
| 2011/0293942 A1 | | 12/2011 | Cornejo et al. |
| 2012/0167626 A1 | * | 7/2012 | Lee et al. ............ 65/25.4 |
| 2012/0216570 A1 | | 8/2012 | Abramov et al. |
| 2013/0047673 A1 | * | 2/2013 | Lee et al. ............ 65/114 |
| 2013/0233847 A1 | * | 9/2013 | Lee et al. ............ 219/678 |
| 2013/0233848 A1 | * | 9/2013 | Lee et al. ............ 219/678 |
| 2014/0182335 A1 | * | 7/2014 | Lee et al. ............ 65/30.14 |

FOREIGN PATENT DOCUMENTS

| | | | | |
|---|---|---|---|---|
| EP | 2471759 A1 | | 4/2012 | |
| EP | 2565168 A1 | | 6/2013 | |
| EP | 2637479 A1 | | 9/2013 | |
| EP | 2637478 A2 | | 11/2013 | |
| JP | 2004203677 A | | 7/2004 | |
| KR | 10-2012-0020258 A | | 3/2012 | |
| WO | WO 01/83387 | * | 11/2001 | ............ C03B 29/00 |

* cited by examiner (a)

(b)

(a)

(b)

APPARATUS FOR CHEMICALLY TOUGHENING GLASS AND METHOD OF CHEMICALLY TOUGHENING GLASS USING THE SAME

CROSS REFERENCE TO RELATED APPLICATION

The present application claims priority from Korean Patent Application Number 10-2012-0122795 filed on Nov. 1, 2012, the entire contents of which are incorporated herein for all purposes by this reference.

BACKGROUND OF THE INVENTION

1. Field of the Invention

The present invention relates to an apparatus for chemically toughening glass and a method of chemically toughening glass using the same, and more particularly, to an apparatus for chemically toughening glass which can toughen the surface of the glass by inducing compressive stress on the glass surface through ion exchange and a method using the same.

2. Description of Related Art

The use of glass materials is soaring in a variety of industrial fields, for example, covers for photovoltaic cells or flat panel displays such as thin-film-transistor liquid crystal displays (TFT-LCDs), plasma display panels (PDPs) and organic electroluminescent (OEL) devices, as well as covers for a variety of mobile electronics. Accordingly, glass materials are required to have a light and thin profile.

However, the light and thin profile of glass materials leads to a reliability problem due to the brittleness of glass. Therefore, studies on a variety of strengthening methods are being carried out in order to realize the reliability of glass.

Glass strengthening methods typically include thermal strengthening (tempering) and chemical toughening (toughening).

Thermal strengthening is the method of strengthening a piece of glass by inducing compressive stress to the surface of the glass by heating the glass surface to a high temperature followed by rapid cooling. However, thermal strengthening has a problem in that heat is not uniformly transmitted over the entire area of the glass due to rapid cooling of the glass, thereby causing the strength of the strengthened glass to be locally non-uniform. In addition, after strengthening, the degree of curvature and light transmittance of the glass is decreased, and the refractive index becomes non-uniform. Furthermore, thermal strengthening also has the problem of inapplicability to laminated glass having a thickness of 2.5 mm or less.

Chemical toughening is the method of toughening a piece of glass by inducing compressive stress to the surface of the glass by exchanging alkali ions having a small ion radius (in general, Na ions) that are present inside the glass with alkali ions having a greater ion radius (in general, K ions). Such chemical toughening is the method that can be usefully applied to a piece of glass having a complicated shape or laminated glass having a thickness of 2 mm or less.

However, such chemical toughening is not practically applied to mass-production processes due to the problems of ion exchange efficiency, ion exchange time, toughening cost, and the like.

The information disclosed in the Background of the Invention section is provided only for better understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an apparatus for chemically toughening glass which can improve the efficiency of chemical toughening of the glass and a method of chemically toughening glass using the same.

In an aspect of the present invention, provided is an apparatus for chemically toughening glass while continuously transporting the glass. The apparatus includes a chemical toughening bath which chemically toughens the glass; a transportation part which transports the glass from upstream of the chemical toughening bath through the chemical toughening bath to downstream of the chemical toughening bath; and a microwave generator disposed above the chemical toughening bath, the microwave generator radiating microwaves to the glass.

In another aspect of the present invention, provided is a method of chemically toughening glass using an apparatus for chemically toughening the glass, the apparatus comprising a chemical toughening bath and a microwave generator. The method includes the following steps of: continuously transporting the glass from upstream of the chemical toughening bath through the chemical toughening bath to downstream of the chemical toughening bath; and chemically toughening the glass that is transported to the chemical toughening bath with the microwave generator radiating microwaves to the glass.

According to the embodiments of the invention, since the microwave generator increases the ion exchange with the glass, it is possible to improve the chemical toughening efficiency of the glass.

In addition, it is possible to increase the strength of the toughened glass by increasing the ion exchange depth of the glass and improve reliability to catastrophic destruction.

Furthermore, since the reflecting part creates uniformity in the electric field over the entire area of the glass, it is possible to allow uniform ion exchange reaction over the entire area of the glass.

In addition, since the reflecting part suppresses the interference between microwaves generated by respective microwave generators, it is possible to restrict localized electric field concentration in the glass.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Figure 1:
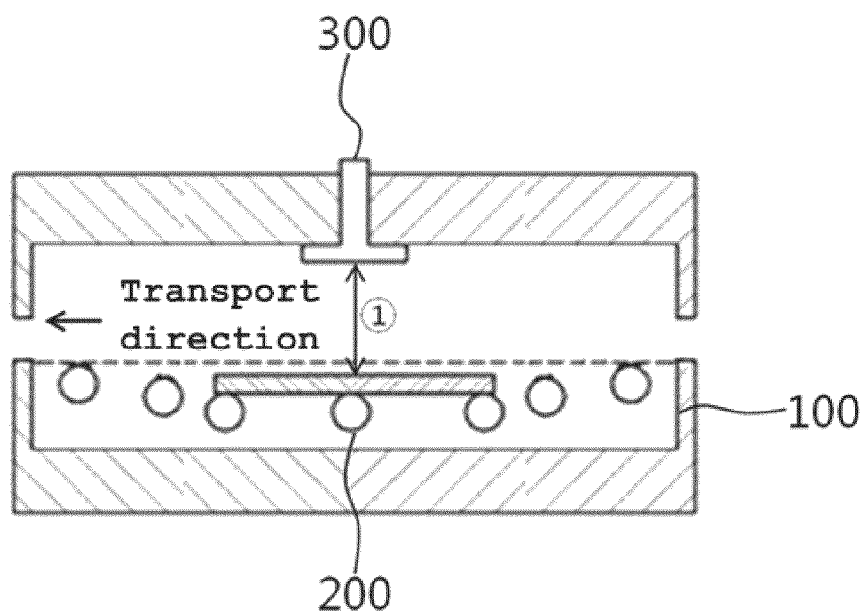
FIG. 1 is a conceptual view showing the cross-section of an apparatus for chemically toughening glass according to an embodiment of the invention.

Reference will now be made in detail to an apparatus for chemically toughening glass and a method of chemically toughening glass using the same according to the present invention, embodiments of which are illustrated in the accompanying drawings and described below, so that a person having ordinary skill in the art to which the present invention relates can easily put the present invention into practice.

Throughout this document, reference should be made to the drawings, in which the same reference numerals and signs are used throughout the different drawings to designate the same or similar components. In the following description of the present invention, detailed descriptions of known functions and components incorporated herein will be omitted when they may make the subject matter of the present invention unclear.

Hereinafter, the longitudinal direction is defined as the direction in which a substrate is transported, and the transverse direction is defined as the direction that crosses the direction in which the substrate is transported.

FIG. 1 is a conceptual view showing the cross-section of an apparatus for chemically toughening glass according to an embodiment of the invention.

Referring to FIG. 1, the apparatus of the invention which chemically toughens glass that is continuously loaded into the apparatus includes a chemical toughening bath 100, a transportation part 200 and a microwave generator 300.

The chemical toughening bath 100 is a reaction bath in which a reaction of chemically toughening glass occurs. It is preferred that the chemical toughening bath 100 be a reaction bath in which a chemical toughening reaction by submerging the glass to be toughened into a potassium nitrate solution and exchanging Na ions of the glass with K ions from the potassium nitrate solution occurs. The chemical toughening bath 100 can be heated by a heater (not shown) and maintain a uniform temperature while the glass is being chemically toughened.

The transportation part 200 transports the glass from upstream of the chemical toughening bath 100 through the chemical toughening bath 100 to downstream of the chemical toughening bath 100.

As the transportation part 200 continuously transports the glass through the chemical toughening bath 100, the productivity of chemical toughening can be improved.

The microwave generator 300 is disposed above the chemical toughening bath 100, and radiates microwaves to the glass.

The microwave generator 300 can generate microwaves ranging from 0.98 to 6.0 GHz, and preferably, from 2.4 to 5.8 GHz.

Figure 2:
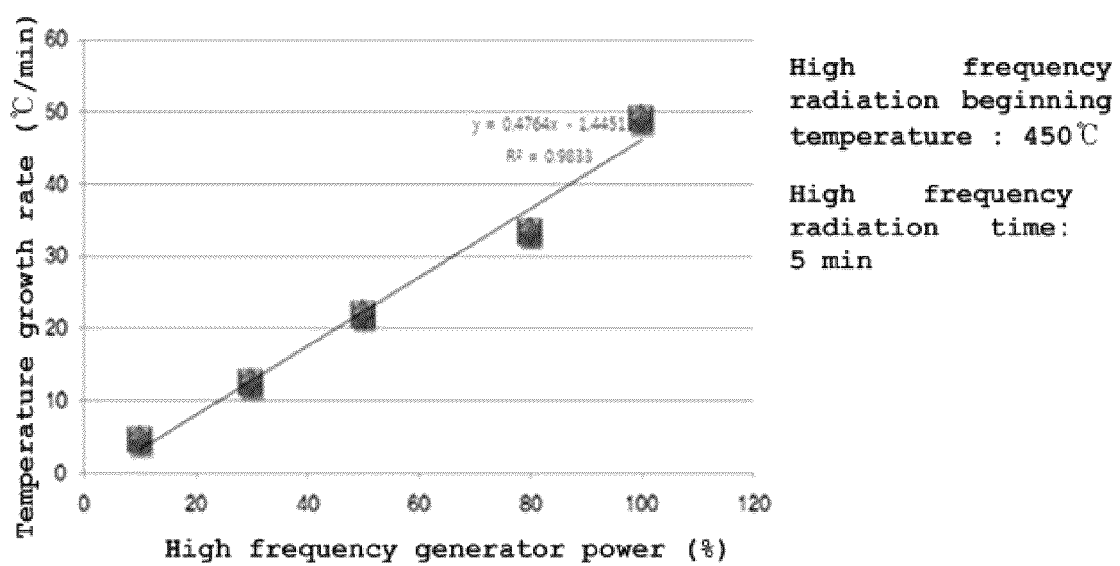
FIG. 2 is a graph showing the temperature growth rate of a potassium nitrate solution depending on the microwave power.

When the microwave generator 300 radiates microwaves to the glass, an alkali ion component (Na—O) of the composition of the glass vibrates in response to microwaves, thereby slightly loosening the intermolecular bonding structure of the glass and generating heat. In addition, when the glass is chemically toughened by the potassium nitrate solution, alkali ions ($K^+$) in the potassium nitrate solution vibrate in response to microwaves, thereby increasing the ion activity of the potassium nitrate solution and generating heat. Due to this phenomenon, the ion exchange reaction of the glass is promoted, thereby reducing the chemical toughening time for the glass. FIG. 2 is a graph showing the temperature growth rate of a potassium nitrate solution depending on the microwave power. Referring to FIG. 2, it can be appreciated that the temperature growth rate of the potassium nitrate solution, or the ion exchange salt, increases in proportion to the microwave power. That is, it is possible to increase the ion exchange activity of the potassium nitrate solution by applying microwaves to the potassium nitrate solution.

It is also possible to increase the ion-exchange depth of the glass through microwave radiation. For instance, when soda-lime silicate glass is submerged into 500° C. potassium nitrate solution and is then irradiated with microwaves for 30 minutes, the soda-lime silicate glass has a compressive stress of 400 MPa and an ion toughening depth ranging from 9.8 to 10.5 μm. When alkali-aluminosilicate glass is submerged into 500° C. potassium nitrate solution and is then irradiated with microwaves for 30 minutes, the alkali-aluminosilicate glass has a compressive stress of 710 MPa and an ion toughening depth ranging from 30.6 to 33.8 μm. These ion toughening depths are improved about 20% than in a related-art case in which no microwaves are radiated.

Figure 3:
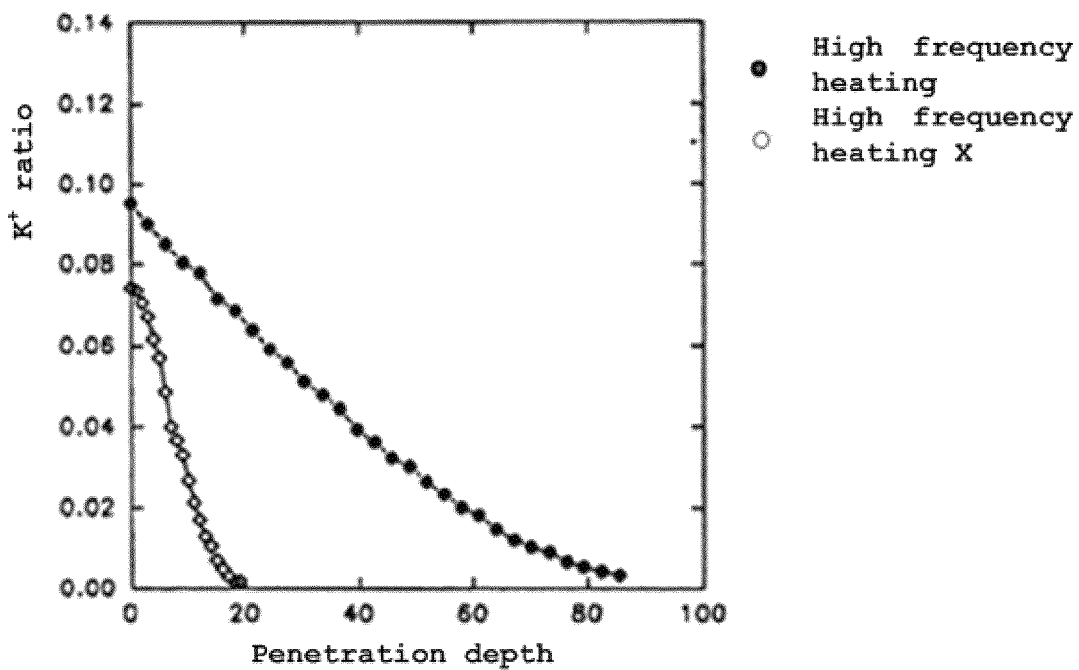
FIG. 3 is a graph showing the effect of microwaves on the ion exchange depth.

This can also be appreciated from FIG. 3 which is a graph showing the effect of microwaves on the ion exchange depth.

According to an embodiment of the invention, the distance ① between the microwave generator 300 and the glass can be nλ. Here, n is an integer, and λ is the wavelength of microwaves generated by the microwave generator 300. It is preferred that n be an integer in the range from 1 to 20. Since the distance between the microwave generator 300 and the glass is nλ, it is possible to maximize the ion exchange efficiency of the glass through microwaves.

Figure 4:
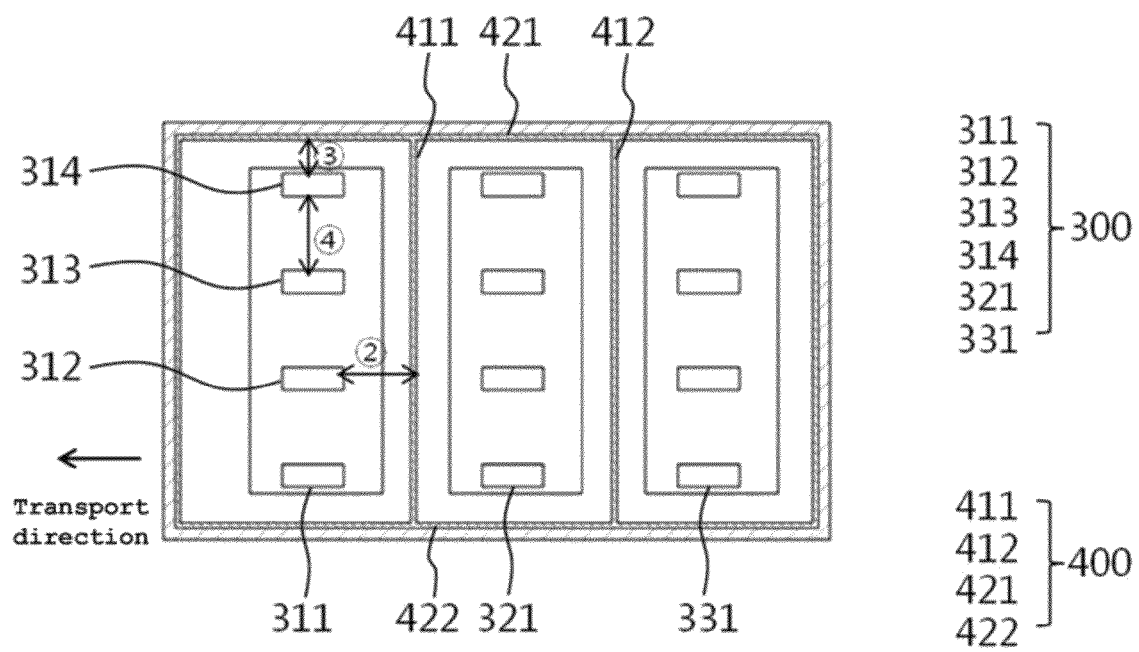
FIG. 4 is a conceptual top-plan view of the apparatus for chemically toughening glass according to an embodiment of the invention.
Figure 5:
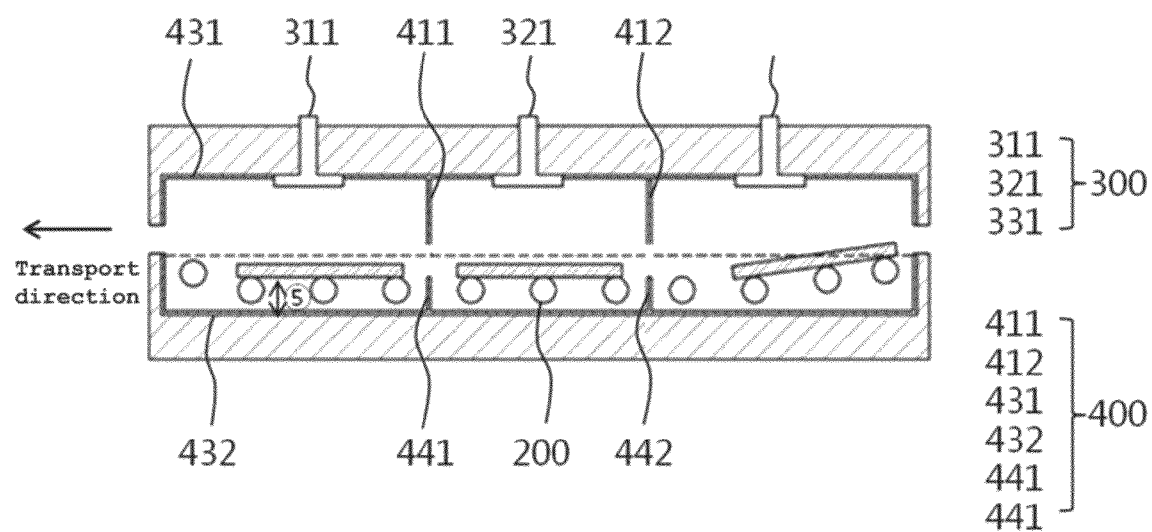
FIG. 5 is a conceptual top-plan view of the apparatus for chemically toughening glass according to an embodiment of the invention.

FIG. 4 and FIG. 5 are conceptual top-plan and cross-sectional views of the apparatus for chemically toughening glass according to an embodiment of the invention.

Referring to FIG. 4 and FIG. 5, the apparatus for chemically toughening glass according to an embodiment of the invention can further include a reflecting part 400 which reflects microwaves generated by the microwave generator 300 to the glass.

The reflecting part 400 reflects microwaves generated by the microwave generator 300 to the glass so that microwaves are multiple scattered. This consequently forms a uniform electric field over the entire area of the glass so that a uniform ion exchange reaction occurs over the entire area of the glass. In addition, it is possible to prevent microwaves generated by the microwave generator 300 from being absorbed by the chemical toughening bath without influencing the glass, thereby improving the efficiency of energy of the microwave generator 300. The reflecting part 400 can be made of conductive metal (stainless steel) that can reflect microwaves.

When the apparatus for chemically toughening glass of the invention includes a plurality microwave generators 300, the reflecting part 400 can partition between the microwave generators 300 such that at least one generator is positioned in each section.

The reflecting part 400 includes first reflecting portions 411 and 412 which are disposed above the glass. The first reflecting portions 411 and 412 partition between microwave generators 311, 321 and 331 which are spaced apart from each other in the longitudinal direction.

In this case, it is preferred that the distance ② between each microwave generator (311, 321, 331) and each first reflecting portion (411, 412) be 2λ in order to efficiently block the interference between microwaves generated by the microwave generators 311, 321 and 331.

The first reflectors 411 and 412 can be configured such that they extend in the transverse direction.

In addition, when a plurality of rows of microwave generators is disposed, the first reflecting portions 411 and 412 can partition between the rows of microwave generators. Here, each row of microwave generators is intended to be formed in the transverse direction. Each first reflecting portion (411, 412) which is formed between rows of microwave generators blocks mutual interference of microwaves generated by the rows of microwave generators, thereby preventing an electric field from being concentrated on a local area of the glass.

In addition, the reflecting part 400 includes second reflecting portions 421 and 422 which partition between microwave generators 311, 312, 313 and 314 which are spaced apart from each other in the transverse direction.

In addition, when at least one row of microwave generators 300 is disposed, the second reflecting portions 421 and 422 can be disposed to the left and/or right of the row of microwave generators 300. In this case, it is preferred that the distance ③ between microwave generators (311, 314) and each second reflecting portion (421, 422) be 2λ or less. In addition, it is preferred that the distance ④ between the microwave generators 311, 312, 313 and 314 which are disposed in one row be 2λ.

The second reflecting portions 421 and 422 can be configured such that they extend in the longitudinal direction.

In addition, the reflecting part 400 can further include third reflecting portions 431 and 432 which are disposed above and/or below the glass such that each main plane thereof faces the main plane of the glass. Since the third reflecting portions 431 and 432 are disposed above and/or below the glass, it is possible to more efficiently reflect microwaves generated by the microwave generator 300 to the glass.

When the third reflecting portions 431 and 432 are disposed below the glass, the distance ⑤ between the glass and each third reflecting portion (431, 432) be λ.

In addition, the reflecting part 400 can further include fourth reflecting portions 441 and 442 which are disposed below the glass at positions corresponding to the first reflecting portions 411 and 412.

Figure 6:
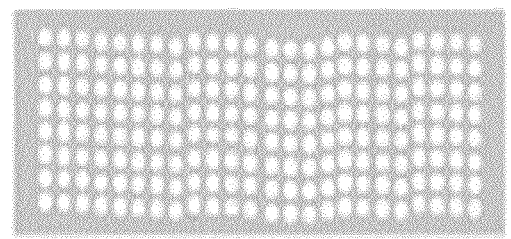
FIG. 6 is a conceptual view of each of the fourth reflecting parts.

The fourth reflecting portions 441 and 442 are disposed in a solution for chemically toughening the glass, preferably, a potassium nitrate solution, each of the fourth reflecting portions 441 and 442 can have a plurality of holes in order to promote the convection of the solution. The diameter of the holes is preferably 3 mm or less. FIG. 6 is a conceptual view of each fourth reflecting part.

Figure 7:
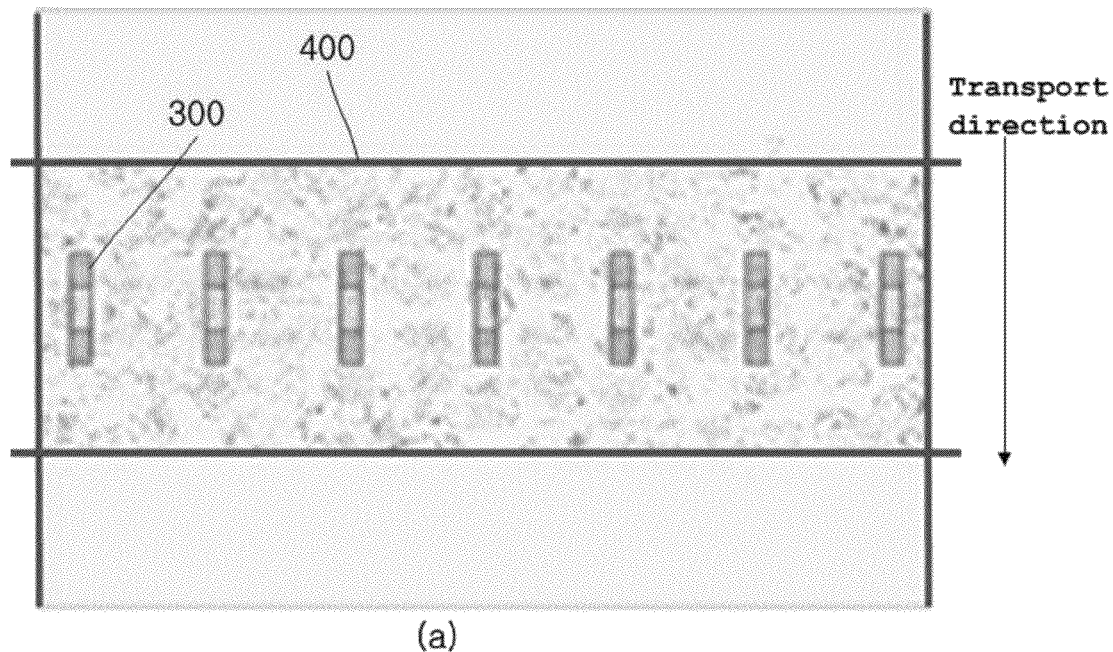
FIG. 7 are photographs showing an electric field distribution analysis (a) and a temperature distribution analysis (b) that are measured by simulating the electric field distribution and the temperature distribution applied to the glass due to microwave radiation when the reflecting part is disposed around four sides of one row of microwave generators.
Figure 7:
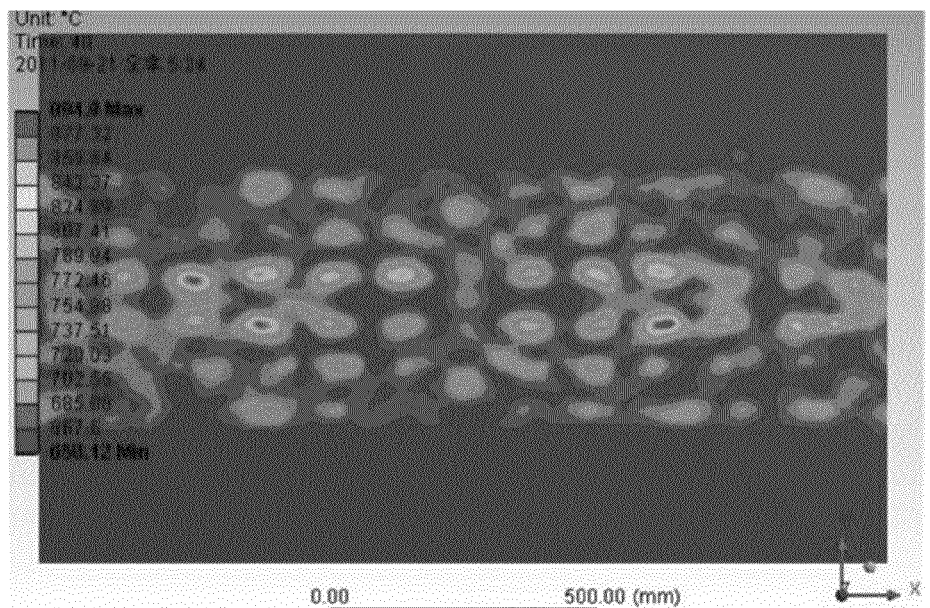

FIG. 7 are photographs showing an electric field distribution analysis (a) and a temperature distribution analysis (b) that are measured by simulating the electric field distribution and the temperature distribution applied to the glass due to microwave radiation when the reflecting part 400 is disposed around the four sides of one row of microwave generators 300. Referring to FIG. 7, when the reflecting part 400 is disposed around the four sides of one row of microwave generators 300, a uniform electric field is formed over the entire area of the glass including corners. From this, it can be appreciated that the entire area of the glass is uniformly heated. This indicates the effect as microwaves generated by the microwave generators are multiple scattered by the reflecting part.

Figure 8:
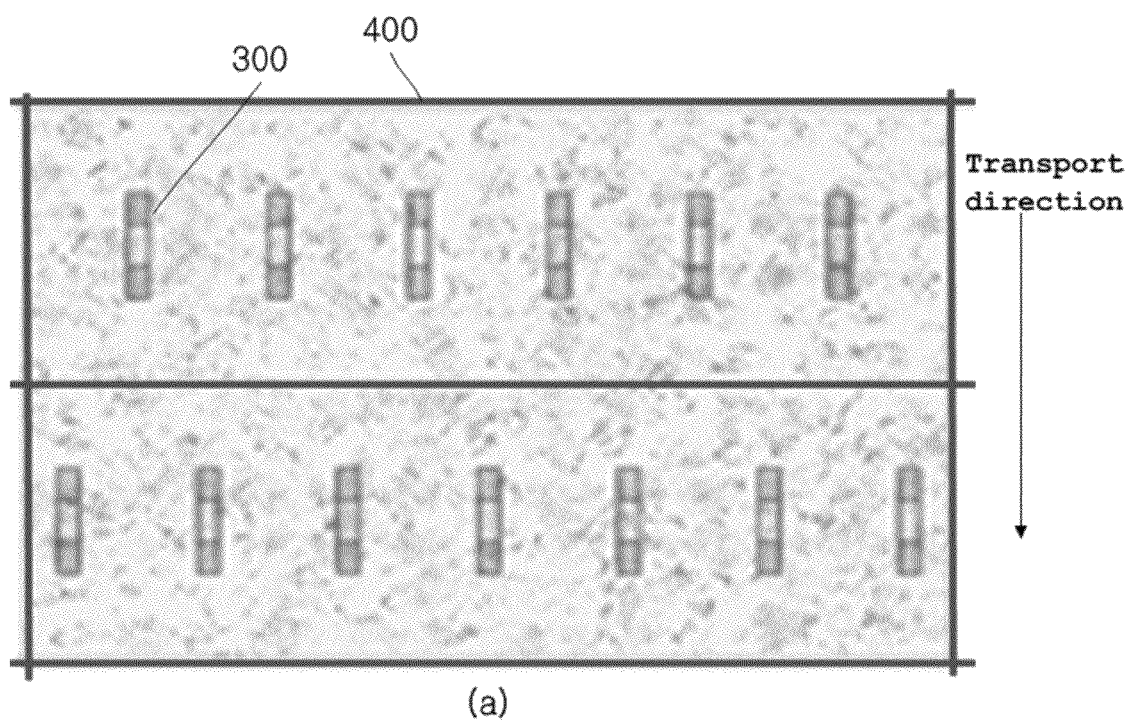
FIG. 8 are photographs showing an electric field distribution analysis (a) and a temperature distribution analysis (b) that are measured by simulating the electric field distribution and the temperature distribution applied to the glass due to microwave radiation when the reflecting part is disposed around four sides of two rows of microwave generators and between the two rows.
Figure 8:
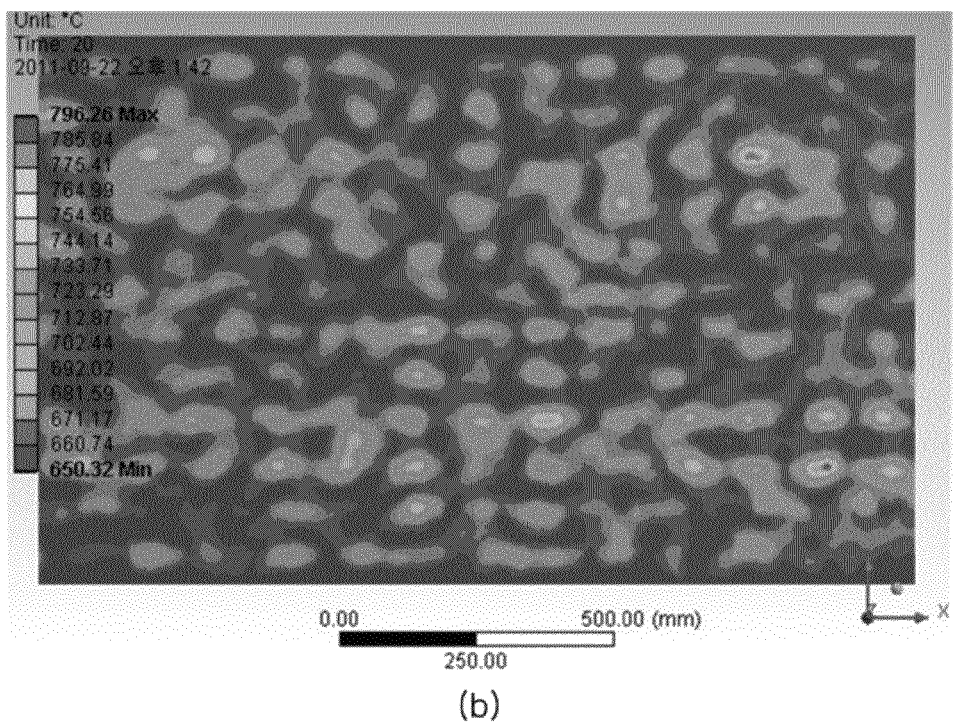

FIG. 8 are photographs showing an electric field distribution analysis (a) and a temperature distribution analysis (b) that are measured by simulating the electric field distribution and the temperature distribution applied to the glass due to microwave radiation when the reflecting part 400 is disposed around the four sides of two rows of microwave generators 300 and between the two rows. Referring to FIG. 8, it can be appreciated that, when the two rows of microwave generators 300 radiate microwaves on the glass, the reflecting part 400 blocks the interference between microwaves generated by the row of microwave generators. Therefore, the same electric field distribution and temperature distribution are produced as in the case in which the microwave generators are disposed in one row.

Figure 9:
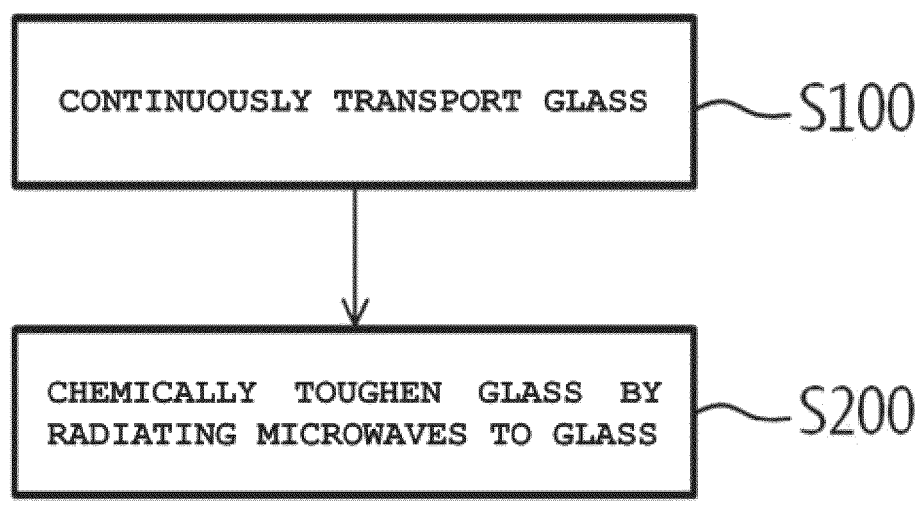
FIG. 9 is a flow diagram schematically showing a method of chemically toughening glass according to another embodiment of the invention.

FIG. 9 is a flow diagram schematically showing a method of chemically toughening glass according to another embodiment of the invention.

Referring to FIG. 9, the present invention provides a method of chemically toughening glass using an apparatus for chemically toughening glass which includes a chemical toughening bath and a microwave generator. The method includes a transport step S100 of continuously transporting the glass from upstream of the chemical toughening bath through the chemical toughening bath to downstream of the chemical toughening bath, and a chemical toughening step S200 of chemically toughening the glass by irradiating the glass transported into the chemical toughening bath with microwaves from a microwave generator.

Here, it is preferred that the distance between the microwave generator and the glass that is being chemically toughened be nλ.

In addition, the apparatus for chemically toughening glass can further include a reflecting part, and at the chemical toughening step S200, the reflecting part reflects microwaves generated by the microwave generator to the glass that is being chemically toughened.

When the apparatus for chemically toughening glass includes a plurality of microwave generators, the reflecting part can include first reflecting portions which are disposed above the glass that is being chemically toughened. The first reflecting portions partition between microwave generators which are spaced apart from each other in the longitudinal direction. At the chemical toughening step S200, the first reflecting portions suppress the interference of microwaves generated by the microwave generators which are spaced apart from each other in the longitudinal direction. It is preferred that the distance between each microwave generator and the adjacent first reflecting portion be 2λ.

In addition, when the apparatus for chemically toughening glass includes a plurality of microwave generators, the reflecting part can include second reflecting portions which partition between microwave generators which are spaced apart from each other in the transverse direction. A the chemical toughening step S200, the second reflecting portions suppress the interference of microwaves generated by the microwave generators which are spaced apart from each other in the transverse direction. In particular, when the microwave generators are disposed in at least one row, the second reflecting portions can be disposed to the left and/or right of the row of microwave generators so as to reflect microwaves that would otherwise be absorbed to the side surface of the apparatus for chemically toughening glass, thereby increasing the energy efficiency of the microwave generators. In this case, it is preferred that the distance between each microwave generator and the adjacent second reflecting portion be $2\lambda$ or less, and that the distance between the microwave generators in each row be $2\lambda$.

In addition, the reflecting part can include third reflecting portions which are disposed above and/or below the glass that is being chemically toughened such that the main plane of each third reflecting portion faces the main plane of the glass. At the chemical toughening step S200, the third reflecting portions reflect microwaves radiated by the microwave generators to at least one surface of the upper surface and undersurface of the glass that is being chemically toughened. It is preferred that the third reflecting portions be disposed below the glass that is being chemically toughened, and that the distance between the glass that is being chemically toughened and the third reflecting portions be $\lambda$.

In addition, the reflecting part can include fourth reflecting portions which are disposed below the glass at positions corresponding to the first reflecting portions. At the chemical toughening step S200, the fourth reflecting portions suppress the interference between microwaves radiated by the microwave generators that are spaced apart from each other in the longitudinal direction.

The foregoing descriptions of specific exemplary embodiments of the present invention have been presented with respect to the drawings. They are not intended to be exhaustive or to limit the invention to the precise forms disclosed, and obviously many modifications and variations are possible for a person having ordinary skill in the art in light of the above teachings.

It is intended therefore that the scope of the invention not be limited to the foregoing embodiments, but be defined by the Claims appended hereto and their equivalents.

What is claimed is:

1. A method of chemically toughening glass using an apparatus for chemically toughening the glass, the apparatus comprising a chemical toughening bath containing a solution for chemically toughening the glass and a microwave generator, the method comprising:
   continuously transporting the glass from upstream of the chemical toughening bath through the solution contained in the chemical toughening bath to downstream of the chemical toughening bath; and
   chemically toughening the glass with the microwave generator radiating microwaves to the glass while the glass passes through the solution.

2. The method of claim 1, wherein, in the process of chemically toughening the glass, a distance between the microwave generator and the glass that is being chemically toughened is $n\lambda$, where n is an integer, and $\lambda$ is a wavelength of microwaves that are generated by the microwave generator.

3. The method of claim 2, wherein the apparatus for chemically toughening the glass further comprises a reflecting part which reflects microwaves radiated by the microwave generator to the glass that is being chemically toughened in the process of chemically toughening the glass.

4. The method of claim 3, wherein
   the apparatus comprises a plurality of the microwave generators, and
   the reflecting part comprises a first reflecting portion disposed above the glass that is being chemically toughened, the first reflecting portion partitioning between the microwave generators which are spaced apart from each other in a longitudinal direction, the longitudinal direction being a direction in which the glass is transported, wherein the first reflector suppresses interference between microwaves radiated by the microwave generators that are spaced apart from each other in the longitudinal direction in the process of chemically toughening the glass.

5. The method of claim 4, wherein the plurality of the microwave generators are disposed in a plurality of rows, and wherein the first reflecting portion partitions between the rows of microwave generators.

6. The method of claim 4, wherein a distance between each of the microwave generators and the first reflector is $2\lambda$.

7. The method of claim 4, wherein the reflecting part comprises a fourth reflecting portion which is disposed below the glass that is being chemically toughened, wherein the fourth reflecting portion suppresses interference between microwaves radiated by the microwave generators that are spaced apart from each other in the longitudinal direction in the process of chemically toughening the glass.

8. The method of claim 7, wherein the fourth reflecting portion has a plurality of holes.

9. The method of claim 3, wherein
   the apparatus comprises a plurality of the microwave generators, and
   the reflecting part comprises a second reflecting portion which partitions between the microwave generators which are spaced apart from each other in a transverse direction, the transverse direction crossing a direction in which the glass is transported, wherein the second reflector suppresses interference between microwaves radiated by the microwave generators that are spaced apart from each other in the transverse direction in the process of chemically toughening the glass.

10. The method of claim 3, wherein the apparatus comprises a plurality of the microwave generators, and the microwave generators are disposed in at least one row, and the reflecting part comprises a second reflecting portion which is disposed at a left side and/or a right side of the at least one row of microwave generators.

11. The method of claim 10, wherein a distance between the at least one row of microwave generators and the second reflecting portion is $2\lambda$ or less.

12. The method of claim 10, wherein a distance between the microwave generators in each row is $2\lambda$.

13. The method of claim 3, wherein the reflecting part comprises a third reflecting portion which is disposed above and/or below the glass that is being chemically toughened, a main plane of the third reflecting portion facing a main plane of the glass, wherein the third reflecting portion reflects microwaves radiated by the microwave generators to the glass that is being chemically toughened in the process of chemically toughening the glass.

14. The method of claim 13, wherein the third reflecting portion is disposed below the glass that is being chemically toughened, a distance between the glass that is being chemically toughened and the third reflecting portion being $\lambda$.

* * * * *